United States Patent [19]
Dillon et al.

[11] Patent Number: 5,325,970
[45] Date of Patent: Jul. 5, 1994

[54] CARRYING CASE FOR PORTABLE COMPUTERS

[76] Inventors: Thomas A. Dillon, 4545 Ocean Valley La., San Diego; Richard E. Hemperly, 2620 Luciernaga St., Carlsbad, Calif. 92009

[21] Appl. No.: 966,690

[22] Filed: Oct. 26, 1992

[51] Int. Cl.$^5$ ............................... H05K 5/00
[52] U.S. Cl. ..................... 206/576; 206/320; 206/328; 150/165; 312/208.3
[58] Field of Search ............ 206/576, 232, 320, 305, 206/328, 816, 814; 150/154, 165; 346/145; 400/685; 364/708; 190/13 R, 13 B, 40; 312/208.3

[56] References Cited

U.S. PATENT DOCUMENTS

| | | | |
|---|---|---|---|
| 3,329,771 | 4/1967 | Rose | 178/7.82 |
| 3,564,138 | 2/1971 | Harrold | 178/7.82 |
| 3,781,471 | 12/1973 | Hoffberger et al. | 178/7.82 |
| 4,294,496 | 10/1981 | Murez | 312/208 |
| 4,314,280 | 2/1982 | Rose | 358/255 |
| 4,444,465 | 4/1984 | Giulie et al. | 350/276 |
| 4,569,572 | 2/1986 | Kopich | 350/276 |
| 4,633,324 | 12/1986 | Giulie | 358/255 |
| 4,784,468 | 11/1988 | Tierney | 350/276 |
| 4,837,590 | 6/1989 | Sprague | 206/305 X |
| 4,896,776 | 1/1990 | Kabanuk et al. | 206/305 X |
| 4,916,550 | 4/1990 | Miyake et al. | 358/471 |
| 4,922,980 | 5/1990 | Parker | 206/320 X |
| 5,105,338 | 4/1992 | Held | 206/305 X |
| 5,115,345 | 5/1992 | Hobson et al. | 359/601 |
| 5,177,665 | 1/1993 | Frank et al. | 206/305 X |

FOREIGN PATENT DOCUMENTS 354543 8/1931 United Kingdom .

*Primary Examiner*—Paul T. Sewell
*Assistant Examiner*—Jacob K. Ackun, Jr.

[57] ABSTRACT

A computer carrying case having internally contained non-reflective folding panels which combine with base and cover portions of the case to form a shield enclosure for a portable computer housed within the case. The shield enclosure excludes most extraneous light and glare and reduces unwanted observation of a viewing screen incorporated in a cover of the computer cover when contained within the shield enclosure. Recessing the viewing screen within the shield enclosure permits the screen to be viewed by the operator while allowing the operator access to the computer data entry device.

2 Claims, 3 Drawing Sheets

CARRYING CASE FOR PORTABLE COMPUTERS

BACKGROUND OF THE INVENTION

The present invention relates to an improved computer carrying case and more particularly to a computer carrying case including a collapsible shield which protects the viewing screen of a contained small portable computer from extraneous light and undesired observation.

The evolution of the computer from a room full of expensive electronics to a small lightweight inexpensive personal productivity tool has caused the use of the computer to proliferate. Computer uses are no longer confined to the office environment. Computer cases have been developed to permit a portable computer and accessories to be carried easily and conveniently by hand, making them accessible for use almost anywhere an operator desires. Efficient batteries and low power electronics in the computer make its operation possible in a broad range of environments relatively independent of external power sources. These environments include outdoor areas in direct sunlight or indoors where light levels can also be high and where light can directly illuminate the computer viewing screen, inhibiting the display visibility. Environments are also encountered where the density and proximity of undesired or unauthorized observers of the computer viewing screen are unacceptable.

Prior and current carrying cases for personal computers provide for computer transport but do not provide for protection of the viewing screen of a contained computer under operating conditions. Also, separate shielding devices have been proposed for the display screens of television monitors and the like, but such devices require attachment to and support by the monitor or display screen. No known application extends the capability of the carrying case to provide the user the ability to operate the computer and view the attached display screen while protecting the viewing area from extraneous light and the eyes of undesired nearby observers.

The instant invention effectively addresses these problems by extending the utility of the computer carrying case. This invention relates to a carrying case which provides a protective means to transport a small portable computer having an attached cover containing the viewing screen, and also forms a shielded enclosure which permits the use of the small portable computer and its viewing screen within the shielded enclosure.

SUMMARY OF THE INVENTION

The invention is an improved portable computer carrying case with a base portion and cover portion which contain, protect, and permit ease of transport of a small personal computer. The case is distinguished from prior art by the inclusion of a self-contained collapsible or foldable shield within the cover portion of the case. The shield can be opened or unfolded when the case is opened to form a protective enclosure within which the contained computer can be operated.

In a preferred embodiment of the carrying case, the shield comprises three panels which are hinged to open, forming mutually perpendicular sides and top of an enclosure. Such panels supplement the base and cover portions of the opened case, which open at right angles to form the bottom and back of the shield enclosure. The three supplementary panels, in conjunction with the base and back, provide light-proof protection for the display screen of a small portable computer recessed within the enclosure. The five sided enclosure thus formed, permits the operator to access the computer controls while viewing the display screen protected from extraneous light and undesired observers.

In the preferred embodiment, the panels can be collapsed along hinges into a compact package within the cover portion of the case. Also, the shield components may be formed of a single unit of opaque fabric, with the panels defined by stiffeners retained by the fabric. The stiffeners provide the proper shape and rigidity for the panels, with the unstiffened fabric serving as a hinge at each appropriate folding seam between the panels and with additional unstiffened fabric used as a seal against light entry between the side panels and the inner surface of the vertically positioned cover portion of the case.

Alternative embodiments of the carrying case of the present invention may include a shield with stiffeners supporting and forming an opaque material into a shield enclosure. Storage of the shield enclosure of such alternative embodiment may be achieved by means other than folding, such as accordion pleating. Additionally, still other embodiments may employ panels of other materials or of other sizes with appropriately placed hinges of any suitable type between panels, and with light shields to seal all seams of the shield enclosure, and various attachment methods between the shield enclosure panels and the carrying case.

BRIEF DESCRIPTION OF THE DRAWINGS

The drawings presented support the detailed description of the preferred embodiment.

DESCRIPTION OF THE PREFERRED EMBODIMENT

Figure 1A:
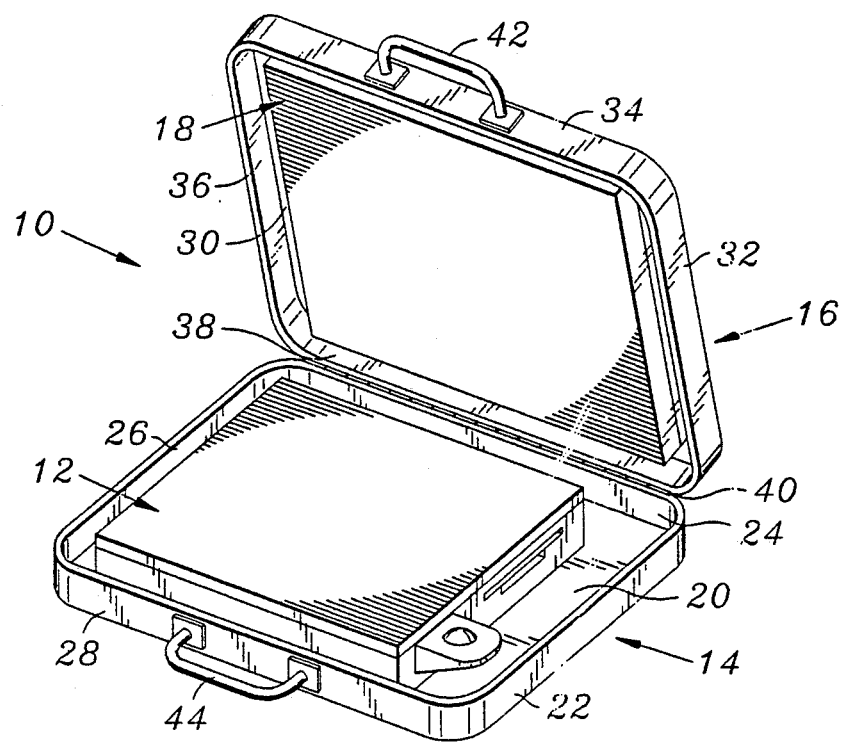
FIG. 1(a) is a perspective view of the improved carrying case opened to show the panels of the shield enclosure folded and stowed in the cover portion and a computer shown positioned in the base portion with its cover closed to protect the display screen and computer controls.
Figure 1B:
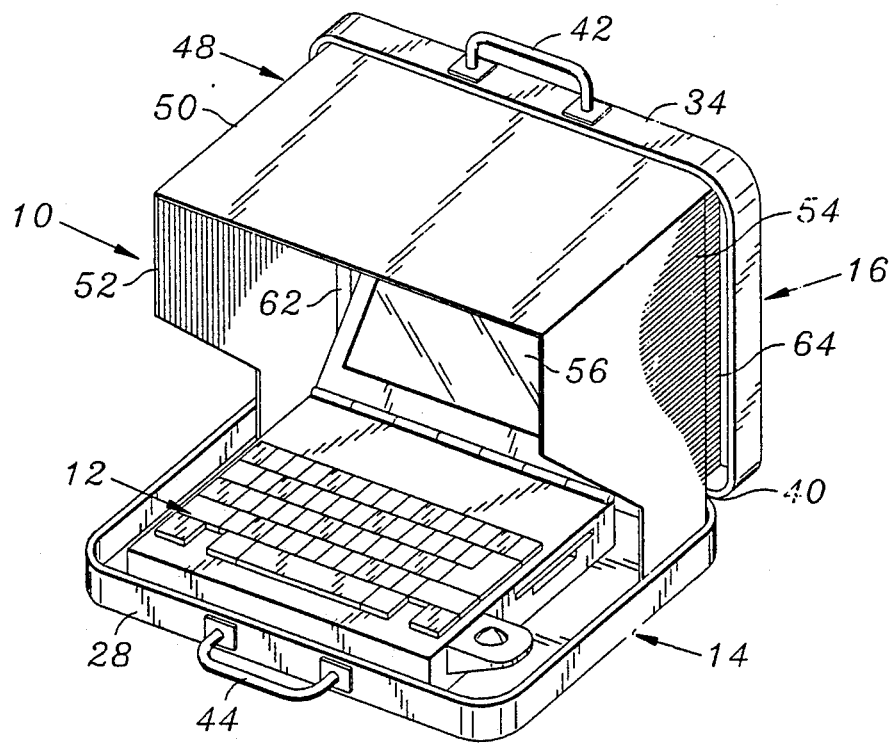
FIG. 1(b) is a perspective view of the improved carrying case and the shielded enclosure erected by the use of the shield panels, with the portable computer installed and the viewing screen positioned for use.
Figure 2:
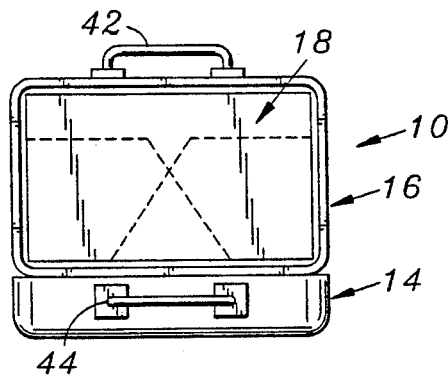
FIG. 2 is a front view of the case with the cover portion open to a vertical position and the panels folded, with hidden panels shown by dotted lines, to illustrate the overlapping panels in the stowed position.
Figure 3:
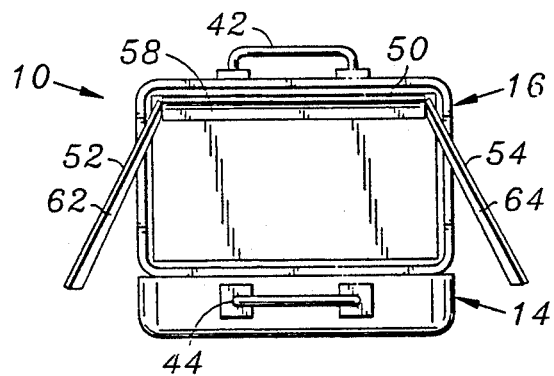
FIG. 3 is a front view showing the top panel raised and the side panels partially extended.
Figure 4:
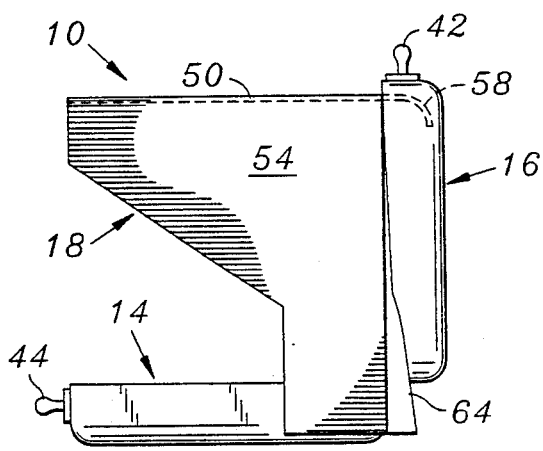
FIG. 4 is a side view of FIG. 3.
Figure 5:
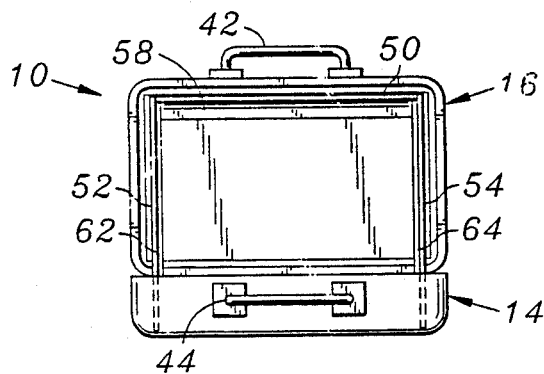
FIG. 5 is a front view with the top panel extended toward the operator and the side panels lowered into the base portion of the case to form the sides of the shield enclosure.

Generally speaking and as shown in FIGS. 1(a) and 1(b), the present invention comprises an improved carrying case 10 for a portable computer 12 having a display screen housed in the computer top cover. The illustrated form of the improved carrying case 10 comprises a base portion 14 and a cover portion 16 hinged to the base portion 14 and a collapsible shield 18 within the cover portion 16.

The base portion 14 includes a flat bottom 20 upon which the computer 12 rests when in a horizontal operating position. Bounding the bottom 20 are four sides 22, 24, 26, and 28 which extend vertically from marginal edges of the bottom 20 to surround corresponding sides of the computer 12.

The cover portion 16 includes a flat top 30 with sides 32, 34, 36, and 38 bounding the top 30 and extending vertically from marginal edges thereby to engage the sides 22, 24, 26, and 28 of the base portion 14 and thereby enclose the computer 12 when the case is closed. In this regard, the cover portion 16 is connected to the base portion 14 by a conventional hinge arrangement 40 secured to and extending along the back sides 24 and 38 of the cover and base portions. Further, to provide means for hand carrying the closed case 10, handles 42 and 44 are provided on the front sides 34 and 28 of the cover and base portions respectively. Also, with case 10 in its horizontal position as shown in FIG. 1(a), an operator may grip and lift the handle 42 to swing the cover portion 16 on the hinge 40 upwardly to the open position as shown.

As shown in FIG. 1(a), when the case 10 is opened, the collapsed shield 18 is exposed within the cover portion 16. As shown in FIG. 1(b), the shield 18 combines with the cover and base portions 16 and 14 of the case 10 to form a shield enclosure 48 which functions to shield the display screen of the computer 12 from excessive light and from undesired viewers.

More particularly, in the preferred carrying case of the present invention, the shield 18 comprises a set of three interconnected panels 50, 52, and 54, folded flat, in an overlapping fashion within the cover portion 16 of the case 10. In FIG. 1(b), the shield 18 is erected with the panel 50 forming a top panel for the shield enclosure 48 hinged to and along a front inner portion of the cover portion 16 of the case. The panels 52 and 54 are hinged to and along left and right edges of the top panel 50 to extend downwardly at right angles to the top panel 50 and the top 30 of cover portion 16. Thus positioned, the panels 52 and 54 define left and right panels for the shield enclosure 48 formed by the shield 18 and the base and cover portions 14 and 16 of the case 10 while the enclosure 48 houses and protects the portable computer 12 in its open position with its display screen 56 recessed within the enclosure.

Figure 7A:
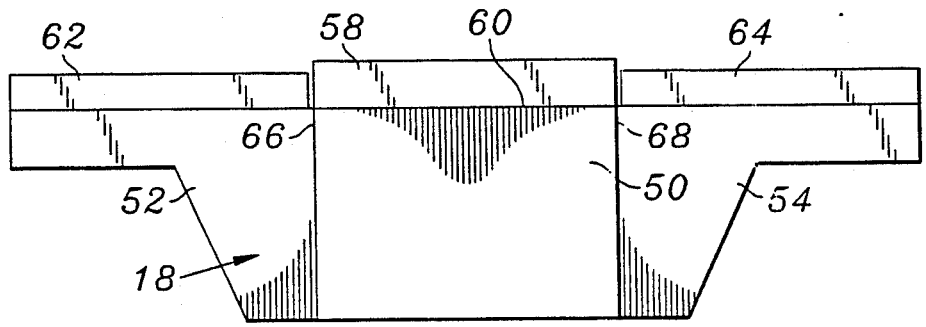
FIG. 7(a) shows the top view of the single unit construction of the shield panels comprising the shield enclosure.
Figure 7B:
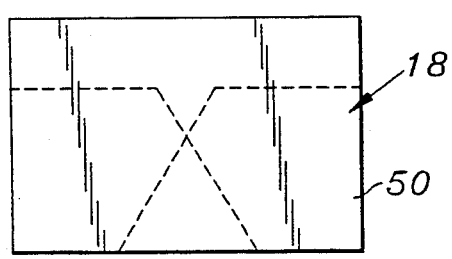
FIG. 7(b) shows the same top view with the side panels folded into the storage position.
Figure 7C:
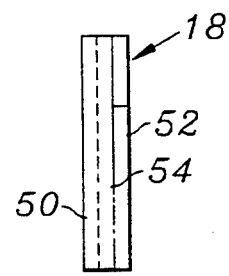
FIG. 7(c) shows a side view of FIG. 7(b) illustrating the compact nature of the folded shield for containment in the cover portion of the case.

In the preferred embodiment, the shield 18 is made of a single unit of flexible non-reflective opaque material (ref.: FIG. 7(a)) formed, using thin rigid plastic sheet stiffeners cut to the approximate shape of the panels, and captured within the shield material. The rear edge of the top panel 50 so formed is attached to the cover portion 16 of the improved carrying case 10 using a tab 58 secured inside the cover portion 16 to serve as a hinge 60 between the top panel 50 and the cover portion 16. The hinge 60 permits the top panel 50 to be positioned horizontally, extending from the inner surface of the cover portion 16 toward a computer operator. The left panel 52 and right panel 54 which are attached to the top panel 50 along their common edges by hinges 66 and 68 respectively, are positioned to extend into the base portion 14 on either side of the computer 12, thereby combining with the base and cover portions 14 and 16 of the case 10 to define the shield enclosure 48 for the computer 12 and its display screen 56 when recessed in the shield enclosure 48. To further light-proof the computer display screen 56 within the shield enclosure 48, the opaque material forming the shield 18 along the back of the side panels 50 and 52 form enclosure seals 62 and 64 between the side panels and the inner surface of the back of the shield enclosure 48 formed by the cover portion 12.

The stiffeners forming the top panel 50, left panel 52, and right panel 54 preferably are thin flat rigid sheets of plastic material cut to provide and retain the desired shape for the top and sides of the shield enclosure 48. When incorporated into the flexible opaque shield enclosure material and erected for use, the stiffeners provide the desired form wherein the top and side panels extend toward the viewer with the top panel 50 horizontally oriented and the side panels 52 and 54 vertically oriented. The opaque shield material between the stiffeners forms the hinges 66 and 68, as well as a light barrier between stiffener panels.

Figure 6:
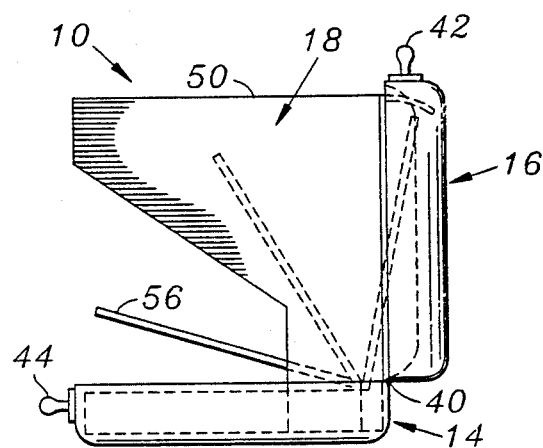
FIG. 6 shows the side view of FIG. 5 illustrating the positioning sequence of the portable computer display screen as it is opened into the recess of the shield enclosure.

The position of the cover portion 16, base portion 14 and shield 18 in their opening and erection sequence for the improved carrying case of the present invention are shown in FIG. 2 through FIG. 6, with the computer display screen 56 opening sequence shown in FIG. 6. From the foregoing description of the carrying case depicted in such Figures, it should be noted that the case, with its functional capability thus extended, provides for significant reduction of extraneous light on the computer screen and restricts viewing by undesired personnel while providing complete access by the operator. Additionally, in its closed configuration the carrying case offers a lightweight protected means for transporting the portable computer.

While a particular and preferred form of carrying case according to the present invention has been depicted and described, changes and modifications can be made without departing from the scope of the present invention. For example, the shield may comprise a bellows arrangement which extends out toward the operator from the storage space in the cover portion of the case and retained in position by stiff metal or plastic rods. Similarly, the Shield may comprise fabric with no reinforcement panels, and with its shape determined by stiff rods inserted into the fabric. Such, as well as other variations are considered to be within the spirit of the invention and within the scope of the appended claims.

We claim:

1. An improved carrying case for containing and transporting a portable computer having a display screen housed in a top of the computer which is hinged to swing between a closed position and a vertically oriented open position wherein the display screen and computer controls are exposed to a user of the computer, said carrying case comprising:

a base portion including a bottom upon which the computer will rest when contained within the case in a normal horizontal operating position;

a cover portion connected to the base portion for swinging between a closed position over the base portion and a vertically extending open position; and a collapsible shield secured to the cover portion wherein said collapsible shield expands from a collapsed condition within the closed carrying case to an open condition wherein the shield extends generally orthogonally to the cover portion and over a part of the base portion int its open condition and combines with the base and cover portions to define a collapsible shield enclosure for the display screen of the computer when it is in the case and is in its open position, the collapsible shield enclosure comprising means for hinging to and for folding within the cover portion to place the shield in its collapsed condition and for unfolding to place the shield in its open condition in the open carrying case, the means comprising a top panel hinged to the cover portion at a rear edge thereof and right and left side panels hinged to the top panel along right and left edges thereof wherein the top panel extends horizontally from the cover portion and the side panels extend from the top panel to the base and cover portions and combine therewith to form five sides of the shield enclosure when the shield is in its open condition.

2. The carrying case of claim 1 wherein the means further comprises light-proof enclosure seals between the side panels and the cover portion for preventing light entry between the side panels and the cover portion.

* * * * *